(12) United States Patent
Hintz et al.

(10) Patent No.: US 11,164,038 B2
(45) Date of Patent: Nov. 2, 2021

(54) IMAGERY EVIDENCE MATCHING SYSTEM

(71) Applicant: Uber Technologies, Inc., San Francisco, CA (US)

(72) Inventors: Jeremy Hintz, Mountain View, CA (US); Lionel Gueguen, Erie, CO (US); Kapil Gupta, Sunnyvale, CA (US); Benjamin James Kadlec, Boulder, CO (US); Susmit Biswas, San Mateo, CA (US)

(73) Assignee: Uber Technologies, Inc., San Francisco, CA (US)

( * ) Notice: Subject to any disclaimer, the term of this patent is extended or adjusted under 35 U.S.C. 154(b) by 97 days.

(21) Appl. No.: 16/536,833

(22) Filed: Aug. 9, 2019

(65) Prior Publication Data

US 2020/0057914 A1 Feb. 20, 2020

Related U.S. Application Data

(60) Provisional application No. 62/718,987, filed on Aug. 16, 2018.

(51) Int. Cl.
*G06K 9/62* (2006.01)
*G06K 9/46* (2006.01)
*G06F 40/30* (2020.01)

(52) U.S. Cl.
CPC .......... *G06K 9/6215* (2013.01); *G06F 40/30* (2020.01); *G06K 9/46* (2013.01); *G06K 9/6217* (2013.01); *G06K 2209/01* (2013.01)

(58) Field of Classification Search
CPC ...... G06K 9/6215; G06K 9/6217; G06K 9/46; G06K 9/685; G06K 2209/01; G06F 40/30; G06F 16/587; G06F 16/50
See application file for complete search history.

(56) References Cited

U.S. PATENT DOCUMENTS 5,963,663 A * 10/1999 Tani ..................... G06K 9/46
382/153
7,809,192 B2 * 10/2010 Gokturk ............ G06K 9/00375
382/176

(Continued)

FOREIGN PATENT DOCUMENTS

CN 107636646 A * 1/2018 ............. G06F 16/29

*Primary Examiner* — Matthew C Bella
*Assistant Examiner* — Kathleen M Broughton
(74) *Attorney, Agent, or Firm* — Schwegman Lundberg & Woessner, P.A.

(57) ABSTRACT

Systems and methods are provided for generating sets of candidates comprising images and places within a threshold geographic proximity based on geographic information associated with each of the plurality of images and geographic information associated with each place. For each set of candidates, the systems and methods generate a similarity score based on a similarity between text extracted from each image and a place name, and the geographic information associated with each image and each place. For each place with an associated image as a potential match, the systems and methods generate a name similarity score based on matching the extracted text of the image to the place name, and store an image as place data associated with a place based on determining that the name similarity score for the extracted text associated with the image is higher than a second predetermined threshold.

20 Claims, 7 Drawing Sheets

(56) References Cited

U.S. PATENT DOCUMENTS

| | | | |
|---|---|---|---|
| 9,143,638 B2* | 9/2015 | King | G06F 16/58 |
| 9,430,719 B2* | 8/2016 | Gokturk | G06F 16/583 |
| 2017/0215028 A1* | 7/2017 | Rhoads | G06F 16/5866 |
| 2018/0014161 A1* | 1/2018 | Warren | H04W 4/023 |

* cited by examiner

TEXT EXTRACTION 1: THEATPE

TEXT EXTRACTION 2: DEN 4TE THE

TEXT EXTRACTION 3: GOLOEN

| | | |
|---|---|---|
| TEXT EXTRACTION 1: | DEN | THEATPE |
| TEXT EXTRACTION 2: | GOLOEN | 4TE THE |
| TEXT EXTRACTION 3: | GOLDEN | GATE THEATRE |
| PLACE NAME: | GOLDEN GATE THEATRE | |

*FIG. 4*

TEXT EXTRACTION 1: THEATPE　G4TE　DEN

TEXT EXTRACTION 2: THE　　　GOLOEN

TEXT EXTRACTION 3: THEATPE　G4TE　GOLDEN

FINAL AGGREGATION: THEATRE　GATE　GOLDEN

PLACE NAME: GOLDEN GATE THEATRE

*FIG. 5*

IMAGERY EVIDENCE MATCHING SYSTEM

CLAIM FOR PRIORITY

This application claims the benefit of priority of U.S. Application Ser. No. 62/718,987, filed Aug. 16, 2018, which is hereby incorporated by reference in its entirety.

BACKGROUND

There are a number of technical challenges to generating a mapping system. For example, to map all the places in a particular region (e.g., country, county, or state), multiple sources comprising place information (e.g., information about entities within regions, such as a business, park, location of interest, or residence) may be used to generate places for the region. These multiple sources may each comprise millions of records associated with places. Each of these sources may contain multiple attributes about each place (e.g., a name, address, category, description, and other information about an entity or place), may have different attributes, may be missing one or more attributes, and so forth, for the same place. For example, one or more sources of place information may have missing addresses, addresses that are not normalized (e.g., different abbreviations may be used, different levels of detail may be included), inaccurate latitude and longitude data, incomplete or inaccurate names, fake and irrelevant places, point of interest data that is not homogeneous, moved or closed places, and so forth. Thus, text matching alone is not sufficient to match a place from multiple sources of place data.

Moreover, matching images to places is also technically challenging. For example, the image may be captured at an awkward angle, may not be in focus, may comprise only partial text or logo, and so forth. Thus, image recognition may be challenging. Moreover, methods of extracting text from an image, such as optical character recognition (OCR) and other techniques, are not perfectly accurate. For example, these methods may confuse letters and numbers, these methods may only be able to detect partial text, the extracted text may include multiple partial extraction, common sequences may appear in many locations (e.g., "church" or "school"), and so forth.

BRIEF DESCRIPTION OF THE DRAWINGS

Various ones of the appended drawings merely illustrate example embodiments of the present disclosure and should not be considered as limiting its scope.

FIGS. 3-5 illustrate examples of text extractions and comparisons against a place name, according to some example embodiments.

DETAILED DESCRIPTION

Figure 1:
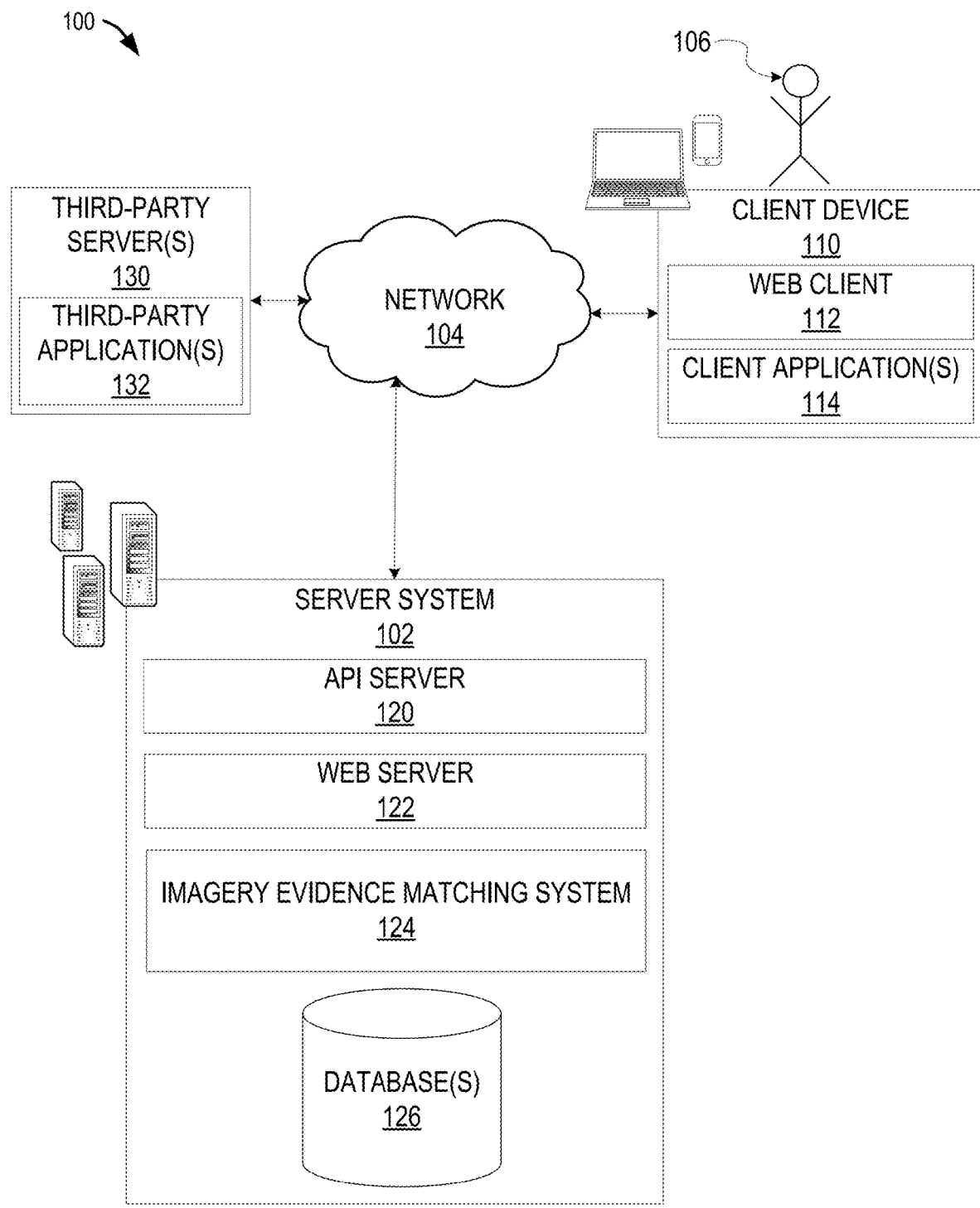
FIG. 1 is a block diagram illustrating a networked system configured to provide imagery evidence matching, according to some example embodiments.

Systems and methods described herein relate to determining whether an image matches a place (e.g., entity or venue). For example, an image may be captured via a camera in a vehicle (e.g., human-driven vehicle or autonomous vehicle, such as a car, truck, scooter, bike, aircraft, and so forth), by a user (e.g., via camera alone or via a device comprising a camera), via satellite, and the like. Determining whether the contents of an image are actually part of a particular place can be quite technically challenging. For example, the image may be captured at an awkward angle, may not be in focus, may comprise only partial text or a partial logo, and so forth. Thus, image recognition in this context is challenging. Moreover, methods of extracting text from an image, such as optical character recognition (OCR) and other techniques, are not perfectly accurate. For example, these methods may confuse letters and numbers or may only be able to detect partial text, the extracted text may include multiple partial extraction, common sequences may appear in many locations (e.g., "church" or "school"), and so forth. In one example, an image taken of a theater with the name "Golden Gate Theatre" in the image is used for extracting text. The text extracted from this image is "CJDtclen Gate Theatre."

Example embodiments provide for analyzing text extracted from images and geographic data to determine whether the text is associated with a particular place. Techniques described herein result in a high accuracy in determining a match between an image and a place. In one example embodiment, a server system accesses image data comprising a plurality of images, text extracted from each of the plurality of images, geographic information associated with each of the plurality of images, and place data comprising geographic information associated with each place and a place name associated with each place. The server system generates sets of candidates comprising images and places within a threshold geographic proximity based on the geographic information associated with each of the plurality of images and the geographic information associated with each place.

For each set of candidates, the server system generates a similarity score based on a similarity between the text extracted from each image and the place name, the geographic information associated with each image, and the geographic information associated with each place. For each place, the server system eliminates each image having a similarity score that is less than a first predetermined threshold as a potential match for a place in order to generate a list of images as potential matches for each place; and associates the place with an image having the highest similarity score in each list of potential matches for each place as the image that is a potential match with the place. For each place with an associated image as a potential match, the server system generates a name similarity score based on matching the extracted text of the image to the place name and stores the image as place data associated with the place based on determining that the name similarity score for the extracted text associated with the image is higher than a second predetermined threshold.

FIG. 1 is a block diagram illustrating a networked system 100, according to some example embodiments, configured to determine whether an image is associated with a place. The system 100 includes one or more client devices such as client device 110. The client device 110 may comprise, but is not limited to, a mobile phone, desktop computer, laptop, portable digital assistants (PDA), smart phone, tablet, ultrabook, netbook, laptop, multi-processor system, microprocessor-based or programmable consumer electronic, game console, set-top box, computer in a vehicle, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth. The client device 110 may be a device of a user that is used to request map information, provide map information, request navigation information, receive and display results of map and/or navigation information, request data about a place or entity in a particular location, receive and display data about a place or entity in a particular location, and so forth.

One or more users 106 may be a person, a machine, or other means of interacting with the client device 110. In example embodiments, the user 106 may not be part of the system 100, but interacts with the system 100 via the client device 110 or other means. For instance, the user 106 may provide input (e.g., touch screen input or alphanumeric input) to the client device 110 and the input may be communicated to other entities in the system 100 (e.g., third-party servers 130, server system 102) via a network 104. In this instance, the other entities in the system 100, in response to receiving the input from the user 106, communicates information to the client device 110 via the network 104 to be presented to the user 106. In this way, the user 106 interacts with the various entities in the system 100 using the client device 110.

The system 100 further includes the network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 accesses the various data and applications provided by other entities in the system 100 via a web client 112 (e.g., a browser, such as the Internet Explorer® browser developed by Microsoft® Corporation of Redmond, Wash. State) or one or more client applications 114. The client device 110 may include the one or more client applications 114 (also referred to as "apps") such as, but not limited to, a web browser, messaging application, electronic mail (email) application, an e-commerce site application, a mapping or location application, and the like.

In some embodiments, the one or more client applications 114 may be included in the client device 110, and configured to locally provide a user interface and at least some of the functionalities, with the client application 114 configured to communicate with other entities in the system 100 (e.g., third-party servers 130, server system 102), on an as needed basis, for data and/or processing capabilities not locally available (e.g., access location information, access software version information, to generate results of security-relevant code detection, to authenticate the user 106, to verify a method of payment, etc.). Conversely, the one or more applications 114 may not be included in the client device 110, and the client device 110 uses its web browser to access the one or more applications hosted on other entities in the system 100 (e.g., third-party servers 130, server system 102).

The server system 102 provides server-side functionality via the network 104 (e.g., the Internet or wide area network (WAN)) to one or more third-party servers 130 and/or one or more client devices 110. The server system 102 may include an application program interface (API) server 120, a web server 122, and an imagery evidence matching system 124, that are communicatively coupled with one or more databases 126.

The one or more databases 126 are storage devices that store data related to one or more of source code, machine learning model training data, image data (including extracted text from images), place or other mapping data, and so forth. The one or more databases 126 may further store information related to the third-party servers 130, third-party applications 132, the client device 110, the client applications 114, the user 106, and so forth. The one or more databases 126 may be cloud-based storage.

The server system 102 is a cloud computing environment, according to some example embodiments. The server system 102, and any servers associated with the server system 102, are associated with a cloud-based application, in one example embodiment.

The imagery evidence matching system 124 provides back-end support for the third-party applications 132 and the client applications 114, which may include cloud-based applications. The imagery evidence matching system 124 processes place data from a variety of sources, analyzes text extracted from images, determines whether or not an image matches a place, trains and utilizes machine learning models for detecting logo and brand information in images, and so forth as described in further detail below. The imagery evidence matching system 124 comprises one or more servers or other computing devices or systems.

The system 100 further includes one or more third-party servers 130. The one or more third-party servers 130 comprise one or more third-party application(s) 132. The one or more third-party application(s) 132, executing on the third-party server(s) 130, interact with the server system 102 via a programmatic interface provided by the API server 120. For example, the one or more the third-party applications 132 may request and utilize information from the server system 102 via the API server 120 to support one or more features or functions on a website hosted by a third party or an application hosted by the third party. The third-party website or third-party application 132, for example, provides software version analysis functionality that is supported by relevant functionality and data in the server system 102.

Figure 2:
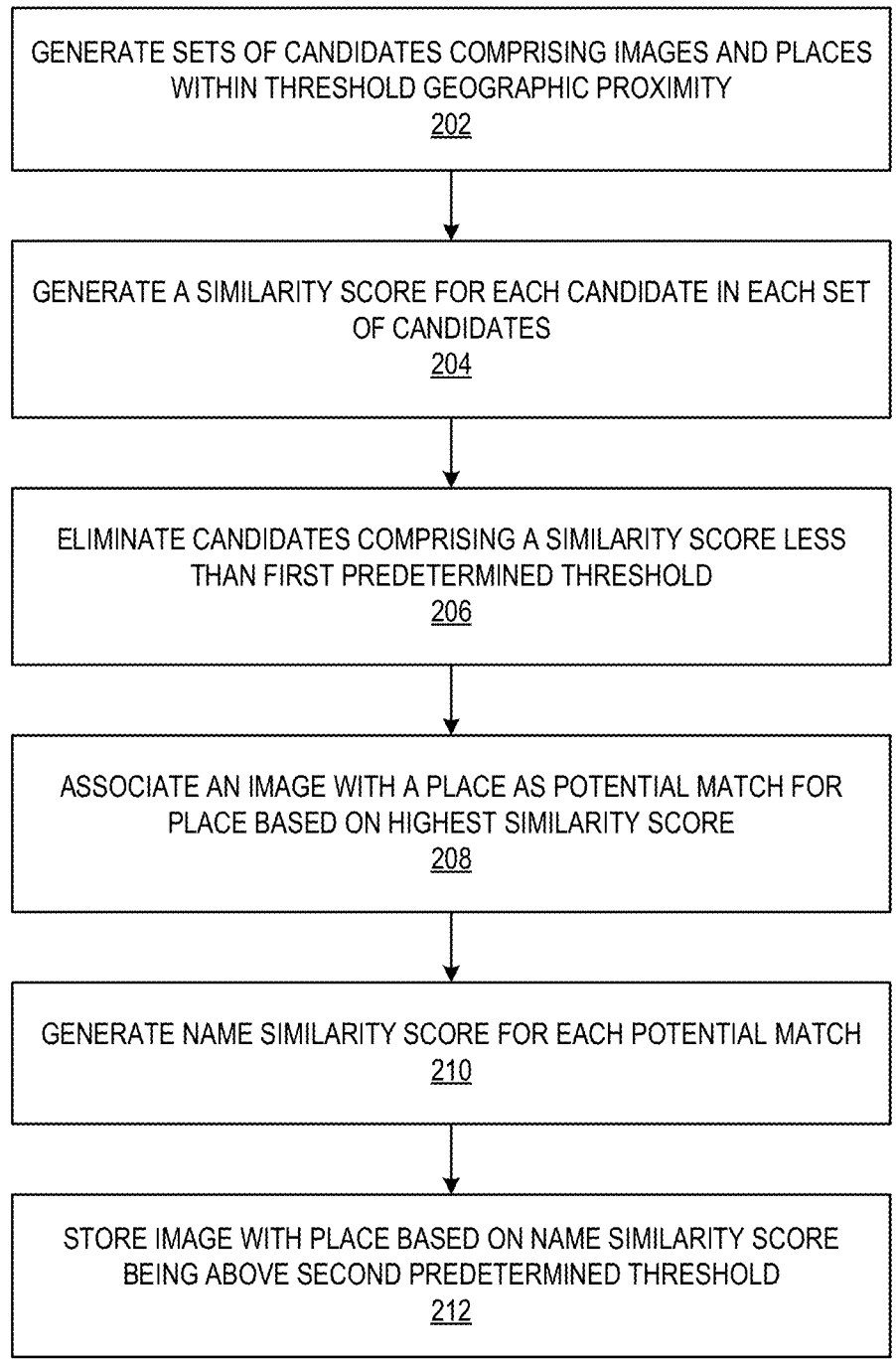
FIG. 2 is flowchart illustrating aspects of a method, according to some example embodiments.

FIG. 2 is a flow chart illustrating aspects of a method 200 for determining whether one or more images match a particular place, according to some example embodiments. For illustrative purposes, the method 200 is described with respect to the networked system 100 of FIG. 1. It is to be understood that the method 200 may be practiced with other system configurations in other embodiments.

In some example embodiments, given a set of places P and a set of images I, the goal is to associate a given place $P_x$ with a corresponding image $I_x$ in which $P_x$ appears. Example embodiments do this by utilizing signals derived from images, such as extracted text from images. In one example, optical character recognition (OCR) technology is used, such as a deep convolutional neural network (CNN) approach or a CNN-LTSM (long short-term memory network). In other examples, other text extraction technologies are used, or a combination of text extraction technologies are used.

In operation 202, a server system (e.g., the server system 102 or the imagery evidence matching system 124) generates sets of candidates comprising images and places within a threshold geographic proximity. For example, the server system accesses image data (e.g., from one or more databases 126 or other data stores associated with the server system or with a third-party system). The image data comprises one or more of a plurality of images, text extracted from the plurality of images, geographic information associated with each of the plurality of images, and so forth. For example, the image data comprises images taken by a satellite, cameras in a vehicle (e.g., human operated or autonomous vehicle), or cameras used by user (e.g., stand-alone camera devices, computing devices incorporating cameras), and the like. The geographic information may comprise geographic coordinates (e.g., latitude and longitude coordinates), address information (e.g., 123 Elm St, corner of Elm and Maple), or other location information for a location where the image was captured. The text extracted from each image may be text extracted using one or more of OCR or other text extraction technologies.

The server system further accesses place data (e.g., from one or more databases 126 or other data stores associated with the server system or with a third-party system). A place is an entity or venue, such as a business (e.g., restaurant, bar, gym, nightclub), a park or outdoor venue (e.g., city park, state park, national park, town square, outdoor theater), a school, a municipal building, a museum, and so forth. The place data may comprise a place name (e.g., Albany Children's Park, San Francisco City Office, Joe's Coffee Shop, Golden Gate Theater), geographic information associated with the place, a category of the place (e.g., park, coffee shop, airport, municipal building, theater), or other data. The geographic information associate with the place may comprise geographic coordinates (e.g., latitude and longitude coordinates), address information (e.g., 123. Elm St, corner of Elm and Maple), or other location information for a location of the place.

The server system may generate the sets of candidates comprising images and places within a threshold geographic proximity based on geographic information associated with each of the plurality of images and the geographic information associated with each place. In one example, generating the sets of candidates comprises isolating sets of similarly co-located images and places using mapping technology such as Google's S2 cell identifiers, as an example. In this example, a map is divided into a grid of cells. Images and places that are located in the same cell (e.g., S2 cell) make up a set of candidates within the geographic proximity (e.g., the grid/cell). In one example, the set of candidates comprises images and places located in the same cell and located in neighboring cells (e.g., S2 cells surrounding the same cell). In this way, images and places are clustered together based on geographic proximity by using data such as geographic coordinates, address information, and so forth. The threshold geographic proximity may be set to the same cell, the same cell and neighboring cells, a particular region (e.g., city, district within a city), a particular cell granularity level (e.g., level 16 of S2 cells), or any combination or division of cells. Moreover, the threshold geographic proximity may vary depending on the location. For example, the threshold geographic proximity may be a smaller distance in a densely populated city than in a rural area.

Generating sets of candidates comprising images and places within a threshold geographic proximity provides for a more efficient system. For example, if instead the server system were to compare all images against all places (e.g., in a city, state, country, world), this would be both computationally intensive and inefficient.

In operation 204, the server system generates a similarity score for each candidate in each set of candidates. For example, for each set of candidates, the server system generates a similarity score based on a similarity between the text extracted for each image and the place name, the geographic information associated with each image, and the geographic information associated with each place. In one example, the server system performs N-M comparisons, where N and M are the number of co-located places and images, respectively. During such a comparison, the server system uses the place name and extracted text from an image and the respective locations. For example, for a particular cell, N is four and M is 10. Thus, there are four places in the cell and ten images. Comparing each of the N places to each of the M images results in performing forty comparisons.

In one embodiment, the server system generates the similarity score based on a similarity between the text extracted from an image and the place name, the geographic information associated with each image, and the geographic information associated with each place. For example, the server system generates a name similarity score by matching a place name with text extracted from the image. In one example, a comparison of the place name and text extracted from the image accounts for the fact that text extractions can often be only partial, with occlusions that lead to only seeing parts of the text at a given time. Furthermore, text extractions will often have at least a few common misclassifications or substitutions.

In one example embodiment, the server system generates a table or dictionary comprising common misclassifications occurring in text extracted from images. In one example, generating the table or dictionary comprises analyzing text extracted from images against the correct words for the text extracted to measure what mistakes occur and how often the mistakes occur in the dataset. An example table or dictionary may comprise the actual text, the guess made by the text extraction technology, and the frequency the misclassification or substitution occurs, as shown in the below example partial table.

| Actual | Guess | Frequency |
|--------|-------|-----------|
| !      | I     | 0.0486111111111 |
| Q      | O     | 0.0384615384615 |
| X      | K     | 0.0187601957586 |
| G      | C     | 0.013396179608 |
| ...    |       |           |

For example, the first row in the above table indicates that an exclamation point was mistaken as an "I" by the text extraction technology 4.86% of the time. The server system may then access the misclassification or substitution table or dictionary comprising the common misclassifications occurring in text extracted from images, align and score the text extracted from an image using the substitution dictionary to modulate character-wise penalties against the place name, and generate a name similarity score based on the alignment and scoring.

In one example embodiment, the server system uses the Smith-Waterman algorithm to align and score one or more partial text extractions from an image, plugging in the substitution table to modulate the character-wise substitution penalties. In one example, the output of the alignment and scoring is a numerical score between 0 and 1 indicating how much the extracted text of the image and the place name have in common.

Figure 3:

FIG. 3 illustrates an example 300 of multiple partial text extractions for an example image. For example, the image may be a sign on a building that reads "Golden Gate Theater." The text extracted from the image, in this example, resulted in multiple partial extractions. For instance, text extraction 1 is "THEATPE," text extraction 2 is "DEN 4TE THE," and text extraction 3 is "GOL0EN."

FIG. 4 illustrates an example 400 of alignment of the multiple text extractions with the place name. In this example, each partial text (e.g., text extraction 1, text extraction 2, and text extraction 3) is aligned with the place name by aligning the text extraction with the location that it may match in the place name. In this example, if the server system performs a normal string comparison for the text extraction and the place name, the server system would get a very low similarity score. By using dynamic programming, however, the server system finds the most optimal alignment that matches the most characters together to determine the alignment for each text extraction with the place name. In one example, this is done by rewarding a matching character and giving a penalty to a mismatched character.

The server system also generates a distance similarity score based on a distance between a location of the place (e.g., determined from the geographic information associated with the place) and the location of the image (e.g., determined from the geographic information associated with the image). In one example, a goal may be to reward geographic proximity when determining whether an image (e.g., extracted text from the image) corresponds to a given place. In order to do this, the server system uses the geocoordinate of the image and the geocoordinate of the place (e.g., from the geographic information associated with the image and place). For example, the server system may calculate the distance similarity score as follows:

$$\text{score} = 1 - \min\left(1, \frac{\text{distance}}{\text{maxRadius}}\right)^2$$

where distance is the distance between the image coordinate and the place coordinate and maxRadius is a value for the largest possible radius for a given place. The parameter maxRadius should be category aware. For example, large parks and stadiums should have a larger maxRadius value than a convenience store or coffee shop since a large park or stadium takes up a larger physical location space than a convenience store or coffee shop. The distance similarity score is a numeric score between 0 and 1 that represents how close are the coordinates of the place and image.

The server system then generates the similarity score between the text extracted from the image and the place name based on the name similarity score and the distance similarity score. In one example embodiment, the server system combines the name similarity score and the distance similarity score using one or more coefficients (e.g., a pair of coefficients). In one example, the coefficients comprise predetermined coefficients that may be hand-tuned to obtain the best results. In another example, the coefficients are learned through a machine learning algorithm that trains a machine learning model to determine what the coefficients (e.g., weights) should be. The combination of the name similarity score and distance similarity score using the coefficients yields a numeric score (e.g., between 0 and 1) that represents the similarity between an image (e.g., extracted text from the image) and a place.

Returning to FIG. 2, the server system eliminates candidates comprising a similarity score less than a predetermined threshold, as shown in operation 206. The server system may use a predetermined threshold (e.g., 0.7, 0.85) that a similarity score must meet to be considered a potential match. The server system eliminates candidates (e.g., images) from a set of potential matches for a place when the candidate's corresponding score does not meet the predetermined threshold. Thus, for each place, the server system eliminates each image comprising a similarity score that is less than a predetermined threshold as a potential match for a place to generate a list of potential matches for each place.

In some embodiments, it is possible that a given place matches multiple images (e.g., text extractions), such as, for example, in the event that two separate images were taken from different sides of the same building. In one example embodiment, a given image should only be associated with one place. Thus, using the similarity score, the server system associates each image (e.g., text extracted from the image) with the place it matches most closely. This association is performed by taking the image with the highest similarity score which will further prune the candidates for image/place matches. Accordingly, the server system associates with the place, the image with the highest similarity score in each list of potential matches for each place, as the image that is a potential match with the place, as shown in operation 208.

In operation 210, the server system generates a name similarity score for each potential match. For example, for each place with an associated image as a potential match, the server system generates a name similarity score based on matching the extracted text of the image to the place name. In one example, this may be a more intensive process than the process described above for generating a name similarity score when generating the similarity score. For example, the server system may use a variation of progressive multiple sequence alignment to align the remaining image candidates with the place name, which is treated as the reference sequence. The server system aggregates the aligned sequence into a single sequence having the same length as the place name, such that characters aligned to a given position hold that position in the new string. In the event that two conflicting characters were aligned to the same position, the server system gives preference to a character that matches the character from the reference string. If neither matches the alignment string in that position, the server system uses the character from the longest string. This process is illustrated in FIG. 5.

FIG. 5 illustrates an example 500 of a multiple sequence alignment and aggregation. As shown in example 500, each text extraction (e.g., text extraction 1, text extraction 2, and text extraction 3) of this example is aligned with the place name. The text extractions are then aggregated into a single sequence (e.g., final aggregation). The single sequence is then compared to the place name to generate a name similarity score. Accordingly, for each place with an associated image as a potential match, the server system aligns the extracted text with the place name and aggregates the aligned extracted text into a single sequence having the same length as the place name.

In one embodiment, the server system eliminates from consideration any candidate that has more than a predetermined percentage (e.g., 40%, 55%) of the sequence incorrect. For example, the server system may eliminate a place and image that is a potential match with the place from consideration for generating a name similarity score based on determining that the single sequence comprised more than a predetermined threshold percent of incorrect characters in the single sequence.

The server system generates the name similarity score based on matching the single sequence to the place name. In one embodiment, the name similarity score is calculated in the same manner as it was calculated above for the name similarity score used for the similarity score, described above.

Returning to FIG. 2, in operation 212, the server system stores an image as place data associated with a place based on determining that the name similarity score is above a predetermined threshold. In one example, the predetermined threshold may be different (e.g., higher) than the predetermined threshold used for initially eliminating candidates with a similarity score less than a predetermined threshold hold (e.g., operation 206). The server system compares the name similarity score to the predetermined threshold to determine whether or not an image should be matched to a place. The output of the process described above is a set of pairings between a place and an image.

Example embodiments provide for a number of benefits. For instance, example embodiments allow for accurate determination of whether an image matches a place. In experiments, a 98.4% precision rate was achieved, a 70.3% recall rate was achieved, and a finding that 84.8% of places confirmed by operators as having visible text. Moreover, example embodiments can be used in a number of applications.

In one example, an image may be used to verify that the place is actually located at the address or geographic coordinates where it is predicted to be located. For instance, a predicted address or geographic coordinates for a place may need to be verified (e.g., a confidence score of the predicted address is below a threshold) and so a human operator is then presented with the images associated with the place to help the human operator confirm whether the predicted address or geographic coordinates actually correspond to the place. For instance, the computing system may cause one or more images associated with the place and/or address or geographic location to be displayed to a user (e.g., via a client device 110) to view and verify that the place is located at the position of the address or geographical coordinates where it is predicted to be located. In one example, the user can leverage the one or more images and other geospatial data, such as aerial images, address, and so forth. Street level views or images and top down views can contain enough information for verifying or correcting an address for a place. Similarly, an associated image may be used to improve coordinate accuracy when predicting the geographical coordinates of the place.

In yet another example, whether the place is likely visible from some of the roads may be inferred by the image data. In another example, an image may be used to prioritize which point of interest to show on a map. For instance, instead of showing points of interest based on popularity, points of interest may be displayed on a map based on visibility (e.g., since the system knows that there is some sign or indication visible about the place), as described in patent application Ser. No. 16/185,978. This may be particularly useful in a map application when providing directions via a computing device to a user. For example, directions can include visual indications or images (e.g., turn left at Safeway) or use places that may have signs visible from the road to assist in navigation. Images may be shown to a user of a mapping or driver application instead of a particular address which may be particularly useful in countries where street addresses are difficult to discern, and people use landmarks to give directions and find a particular location.

In yet another example, image data may improve the pickup experience in ride-sharing applications. For instance, a ride-sharing or car hire service application may surface rendezvous points for riders and drivers near points of interest that will be visible to both the rider and driver, so it is clear where they should meet. In another example, hotspots may be associated with visibility and imagery data and surfaced to a rider application and driver application with a corresponding hotspot, and display when a hotspot is selected in the application. Hotspots may be places that are more convenient for people to meet, for drivers to pick up or drop off passengers or products, popular pickup and drop off points based on historical data, and the like.

In another example, images may be used in delivery situations to display in a delivery application to drivers an image of the location to deliver an item so that the driver does not need to find a particular address. For example, a computing device (e.g., client computer 110) requests navigation instruction for item pickup or delivery from a computing system (e.g., a backend system such as server system 102). The computing system determines whether or not there are any images of the place of pickup or delivery location. If so, the computing system selects an image and provides it to the computing device to display it to the driver for navigation. The image can be selected at random, based on a quality value of the image that is stored as metadata for the image, based on a direction of approach by the driver, or the like.

In one example embodiment, the computing system selects the best image to present to the driver based on the direction the driver is approaching the destination, such that the image resembles the same view as the driver and can be easily located visually. For instance, the computing system determines a direction the driver is approaching based on location information received from the computing device, navigation instructions, or other means, and also determines (e.g., from metadata associated with each image) an image that was captured in a view that can be visually seen from the direction the driver is approaching the pickup or delivery location. The computing system provides the image to the computing device to cause the image to display on the computing device.

Another application utilizing image data is logo detection. For example, a place may not have text or a sign visible on the building, but instead use a logo to identify the place. A simple example is the double arches for McDonald's or the mermaid for Starbucks Coffee. It would be useful to associate images with logos and brand information with a place in addition to, or in lieu of, text extraction since there may be instances where images only capture a logo or brand or where textual information may be in another language, and so forth.

In one example embodiment, a server system (e.g., server system 102 or imagery evidence matching system 124) trains a machine learning model to detect logos and brands associated with a particular place (e.g., business or other entity). In one example, a classification model may be used, such as logistic regression, decision tree, random forest, gradient-boosted tree, multilayer perceptron, one-vs-res, naive Bayes, deep convolutional network, and the like.

In one example embodiment, training data is generated based on samples of locations for particular entities. A sampling of images taken in a particular region may also generated for the particular entities. For example, the server system accesses one or more data stores comprising place data and image data, as described above. Using a simple example, samples of location for particular entities, such as OXXO and Pemex entities in Mexico, are used for training data. In one example, the images are taken from cameras mounted in vehicles. Images taken by other mechanisms can also be used in other embodiments, as also described above.

To generate the training data from the locations of entities and the images, the server system generates samples from the dataset of images and divides the samples into junk and particular entities, such as OXXO and Pemex, using the example above. Junk entries are images that may be blank or not near a particular location (e.g., within a predetermined distance from a particular location) associated with one of the entities. In one example, the server system trains iteratively to build a stronger concept of which images actually contain a particular entity and finds that the blank images are more similar to non-entity images that are also sampled. In one example, blank images can also be labeled to be used in training.

The images divided into samples for particular entities may be based on determining that the images were associated with a location of one of the particular entities (e.g., using geographic information for the places (e.g., entities) and geographic information for the images). In this way, many millions or billions of locations and images can be processed by the server system to generate training data. The server system divides the training data into training data and testing data to train a machine learning model. Processing such a large amount of data is not feasible in a manual way.

The server system then uses the training data to train the machine learning model and the testing data to test the machine learning model. In one embodiment, after the machine learning model is trained with the initial dataset described above, the training dataset is culled by choosing all the images that resulted in a score above a predetermined threshold (e.g., 0.95, 0.9) and retraining the machine learning model with the subset of images above the predetermined threshold. This retraining provides the benefit of removing many images that were falsely associated with a particular entity and thus improves the precision of the machine learning model.

The trained machine learning model can then be used to match images to places. For example, the machine learning model can analyze images to determine whether or not the images comprise logos or other brand information associated with a place. For example, the server system may access one or more of a plurality of images and input the images into the trained machine learning model (e.g., one or more images associated with a location for which the presence of a place covered by the trained machine learning model is unknown, are input into the trained machine learning model).

The trained machine learning model analyzes the images and outputs a logo detection score (e.g., between 0 and 1) indicating how likely an input image comprises a logo or other brand information associated with a place. In one example, the trained machine learning model detects a logo in multiple images and then triangulates those images through a fusion process to determine the likelihood the logo is associated with a place.

As described above for matching text extractions to a place name, an image may be stored as place data associated with a particular place based on determining that a logo detection score is higher than a predetermined threshold (e.g., 0.75, 0.8, 0.9). Accordingly, additional image data may be used for many applications, such as the ones described earlier.

Moreover, additional locations of particular entities may be identified using the machine learning model. For example, a certain number of locations of a particular entity may be known based on place data, however, there may be many more locations of the entity that are not known. The server system uses the machine learning model to identify logos/brands in images and then determines if there are images associated with the entity in unknown locations. These locations are then added to the place data as additional locations for the entity. For example, there may be place data for 50% of the OXXO locations in Mexico. The server system uses the images identified by the machine learning model to identify additional OXXO locations by determining locations where many images converge indicating a previously-unknown OXXO location. In one example, thresholds can be established for a given place category, such as a number of sightings, size of extracted evidence, and so forth. When one or more of the thresholds are met, this will satisfy a likelihood for indicating the presence of a previously unknown place. The server system then generates a new record for the new OXXO location, and stores the name of the place (e.g., OXXO) and the associated images as place data associated with the place.

For example, the server system accesses image data comprising a plurality of images and the geographic information associated with each of the plurality of images, as explained above with respect to FIG. 2. The server system then analyzes the image data for each of the plurality of images, using a trained machine learning model configured to determine how likely an image comprises a logo associated with a place, to generate a logo detection score, as described above. The server system determines whether the logo detection score for each of the plurality of images is greater than a predetermined threshold and stores an image as place data associated with a place, based on determining that the name similarity score for the extracted text associated with the image is higher than a second predetermined threshold.

The following examples describe various embodiments of methods, machine-readable media, and systems (e.g., machines, devices, or other apparatus) discussed herein.

Example 1

A computer-implemented method comprising:
accessing, by a server system, image data comprising a plurality of images, text extracted from each of the plurality of images, and geographic information associated with each of the plurality of images;
accessing, by the server system, place data comprising geographic information associated with each place and a place name associated with each place;
generating, by the server system, sets of candidates comprising images and places within a threshold geographic proximity based on the geographic information associated with each of the plurality of images and the geographic information associated with each place;
for each set of candidates generating, by the server system, a similarity score based on a similarity between the text extracted from each image and the place name, the geographic information associated with each image, and the geographic information associated with each place;
generating, by the server system, a list of images as potential matches for each place by eliminating, for each place, each image having a similarity score that is less than a first predetermined threshold as a potential match;
associating, with each place, an image with the highest similarity score in each list of potential matches for each place as the image that is a potential match with each place;

for each place with an associated image as a potential match, generating a name similarity score based on matching the text extracted from the associated image to the place name for each place; and storing the associated image as place data associated with a place, based on determining that the name similarity score for the extracted text associated with the image is higher than a second predetermined threshold.

Example 2

A method according to example 1, wherein the geographic information associated with each of the plurality of images includes latitude and longitude information associated with a location of each of the plurality of images.

Example 3

A method according to any of the previously examples, wherein the threshold geographic proximity comprises an S2 cell and neighboring S2 cells.

Example 4

A method according to any of the previously examples, further comprising:
accessing the image data comprising a plurality of images and the geographic information associated with each of the plurality of images;
analyzing the image data for each of the plurality of images, using a trained machine learning model configured to determine how likely an image comprises a logo associated with a place, to generate a logo detection score;
determining whether the logo detection score for each of the plurality of images is greater than a predetermined threshold; and
storing an image as place data associated with a place, based on determining that the name similarity score for the extracted text associated with the image is higher than a second predetermined threshold.

Example 5

A method according to any of the previously examples, wherein generating the similarity score based on the similarity between the text extracted from each image and the place name, the geographic information associated with each image, and the geographic information associated with each place comprises:
matching a place name with text extracted from an image to generate a name similarity score;
generating a distance similarity score based on a distance between a location of the place determined from the geographic information associated with the place and the location of the image determined from the geographic information associated with the image; and
generating the similarity score based on the name similarity score and the distance similarity score.

Example 6

A method according to any of the previously examples, wherein matching the place name with text extracted from each image to generate a name similarity score comprises:

accessing a previously generated substitution dictionary comprising common misclassifications occurring in text extracted from images;
aligning and scoring text extracted for an image using the substitution dictionary to modulate character-wise substitution penalties against the place name; and
generating the name similarity score based on the aligning and scoring.

Example 7

A method according to any of the previously examples, wherein generating the similarity score based on the name similarity score and the distance similarity score comprises combining the name similarity score and the distance similarity score using a pair of coefficients learned through a machine learning model.

Example 8

A method according to any of the previously examples, wherein generating the name similarity score based on matching the extracted text of the image to the place name comprises:
for each place with an associated image as the potential match, aligning the extracted text with the place name and aggregating the aligned extracted text into a single sequence a same length as the place name; and
generating the name similarity score based on matching the single sequence to the place name.

Example 9

A method according to any of the previously examples, further comprising:
eliminating a place and the image that is a potential match with the place from consideration for generating a name similarity score based on determining that the single sequence comprises more than a predetermined threshold percent of incorrect characters in the single sequence.

Example 10

A server computer comprising:
a memory that stores instructions; and
one or more processors configured by the instructions to perform operations comprising:
accessing image data comprising a plurality of images, text extracted from each of the plurality of images, and geographic information associated with each of the plurality of images;
accessing place data comprising geographic information associated with each place and a place name associated with each place;
generating sets of candidates comprising images and places within a threshold geographic proximity based on the geographic information associated with each of the plurality of images and the geographic information associated with each place;
for each set of candidates, generating a similarity score based on a similarity between the text extracted from each image and the place name, the geographic information associated with each image, and the geographic information associated with each place;
generating a list of images as potential matches for each place by eliminating, for each place, each image having a similarity score that is less than a first predetermined threshold as a potential match;

associating, with each place, an image with the highest similarity score in each list of potential matches for each place as the image that is a potential match with each place;

for each place with an associated image as a potential match, generating a name similarity score based on matching the text extracted from the associated image to the place name for each place; and storing the associated image as place data associated with a place, based on determining that the name similarity score for the extracted text associated with the image is higher than a second predetermined threshold.

Example 11

A server computer according to any of the previously examples, wherein the geographic information associated with each of the plurality of images includes latitude and longitude information associated with a location of each of the plurality of images.

Example 12

A server computer according to any of the previously examples, wherein the threshold geographic proximity comprises an S2 cell and neighboring S2 cells.

Example 13

A server computer according to any of the previously examples, the operations further comprising:
    accessing the image data comprising a plurality of images and the geographic information associated with each of the plurality of images;
    analyzing the image data for each of the plurality of images, using a trained machine learning model configured to determine how likely an image comprises a logo associated with a place, to generate a logo detection score;
    determining whether the logo detection score for each of the plurality of images is greater than a predetermined threshold; and
    storing an image as place data associated with a place, based on determining that the name similarity score for the extracted text associated with the image is higher than a second predetermined threshold.

Example 14

A server computer according to any of the previously examples, wherein generating the similarity score based on the similarity between the text extracted from each image and the place name, the geographic information associated with each image, and the geographic information associated with each place comprises:
    matching a place name with text extracted from an image to generate a name similarity score;
    generating a distance similarity score based on a distance between a location of the place determined from the geographic information associated with the place and the location of the image determined from the geographic information associated with the image; and
    generating the similarity score based on the name similarity score and the distance similarity score.

Example 15

A server computer according to any of the previously examples, wherein matching the place name with text extracted from each image to generate a name similarity score comprises:
    accessing a previously generated substitution dictionary comprising common misclassifications occurring in text extracted from images;
    aligning and scoring text extracted for an image using the substitution dictionary to modulate character-wise substitution penalties against the place name; and
    generating the name similarity score based on the aligning and scoring.

Example 16

A server computer according to any of the previously examples, wherein generating the similarity score based on the name similarity score and the distance similarity score comprises combining the name similarity score and the distance similarity score using a pair of coefficients learned through a machine learning model.

Example 17

A server computer according to any of the previously examples, wherein generating the name similarity score based on matching the extracted text of the image to the place name comprises:
    for each place with an associated image as a potential match, aligning the extracted text with the place name and aggregating the aligned extracted text into a single sequence a same length as the place name; and
    generating the name similarity score based on matching the single sequence to the place name.

Example 18

A server computer according to any of the previously examples,
    wherein the operations further comprise:
    eliminating a place and the image that is a potential match with the place from consideration for generating a name similarity score based on determining that the single sequence comprises more than a predetermined threshold percent of incorrect characters in the single sequence.

Example 19

A non-transitory computer-readable medium comprising instructions stored thereon that are executable by at least one processor to cause a computing device to perform operations comprising:
    accessing image data comprising a plurality of images, text extracted from each of the plurality of images, and geographic information associated with each of the plurality of images;
    accessing place data comprising geographic information associated with each place and a place name associated with each place;
    generating sets of candidates comprising images and places within a threshold geographic proximity based on the geographic information associated with each of the plurality of images and the geographic information associated with each place;

for each set of candidates, generating a similarity score based on a similarity between the text extracted from each image and the place name, the geographic information associated with each image, and the geographic information associated with each place;

generating a list of images as potential matches for each place by eliminating, for each place, each image having a similarity score that is less than a first predetermined threshold as a potential match;

associating, with each place, an image with the highest similarity score in each list of potential matches for each place as the image that is a potential match with each place;

for each place with an associated image as a potential match, generating a name similarity score based on matching the text extracted from the associated image to the place name for each place; and storing the associated image as place data associated with a place, based on determining that the name similarity score for the extracted text associated with the image is higher than a second predetermined threshold.

Example 20

A non-transitory computer-readable medium according to any of the previously examples, wherein generating the similarity score based on the similarity between the text extracted from each image and the place name, the geographic information associated with each image, and the geographic information associated with each place comprises:

matching a place name with text extracted from an image to generate a name similarity score;

generating a distance similarity score based on a distance between a location of the place determined from the geographic information associated with the place and the location of the image determined from the geographic information associated with the image; and generating the similarity score based on the name similarity score and the distance similarity score.

Figure 6:
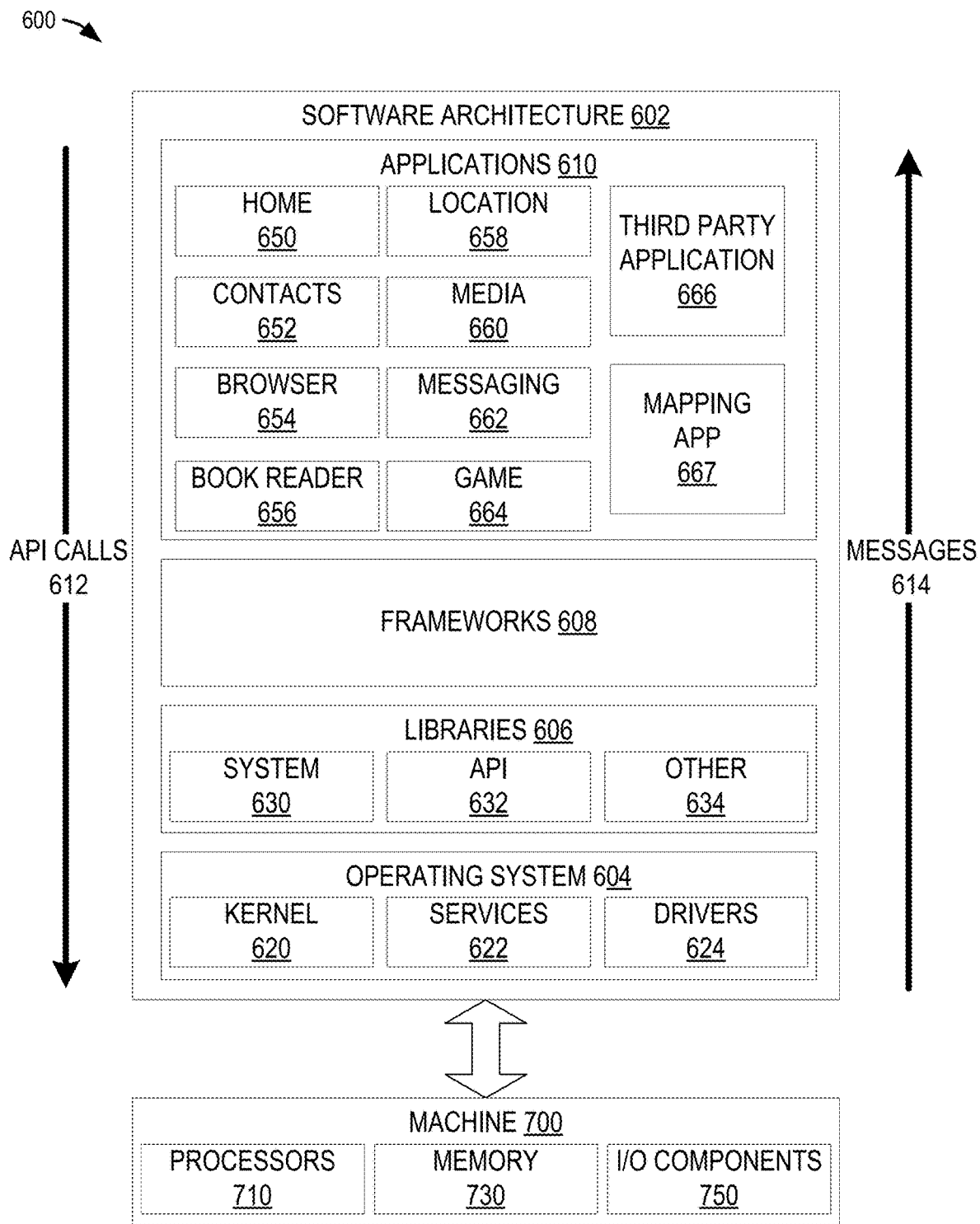
FIG. 6 is a block diagram illustrating an example of a software architecture that may be installed on a machine, according to some example embodiments.

FIG. 6 is a block diagram 600 illustrating software architecture 602, which can be installed on any one or more of the devices described above. For example, in various embodiments, client devices 110 and servers and systems 130, 102, 120, 122, and 124 may be implemented using some or all of the elements of software architecture 602. FIG. 6 is merely a non-limiting example of a software architecture, and it will be appreciated that many other architectures can be implemented to facilitate the functionality described herein. In various embodiments, the software architecture 602 is implemented by hardware such as machine 700 of FIG. 7 that includes processors 710, memory 730, and I/O components 750. In this example, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke application programming interface (API) calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, camera drivers, BLUETOOTH® or BLUETOOTH® Low Energy drivers, flash memory drivers, serial communication drivers (e.g., Universal Serial Bus (USB) drivers), WIFI® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610, according to some embodiments. For example, the frameworks 608 provide various graphic user interface (GUI) functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications such as a third-party application 666. According to some embodiments, the applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third-party application 666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 666 can invoke the API calls 612 provided by the operating system 604 to facilitate functionality described herein.

Some embodiments may particularly include a mapping application 667. In certain embodiments, this may be a stand-alone application that operates to manage communications with a server system such as third-party servers 130 or server system 102. In other embodiments, this functionality may be integrated with another application. The mapping application 667 may request and display various data related to mapping and navigation, and may provide the capability for a user 106 to input data related to the objects via a touch interface, keyboard, or using a camera device of machine 700, communication with a server system via I/O components 750, and receipt and storage of object data in memory 730. Presentation of information and user inputs associated with the information may be managed by mapping application 667 using different frameworks 608, library 606 elements, or operating system 604 elements operating on a machine 700.

Figure 7:
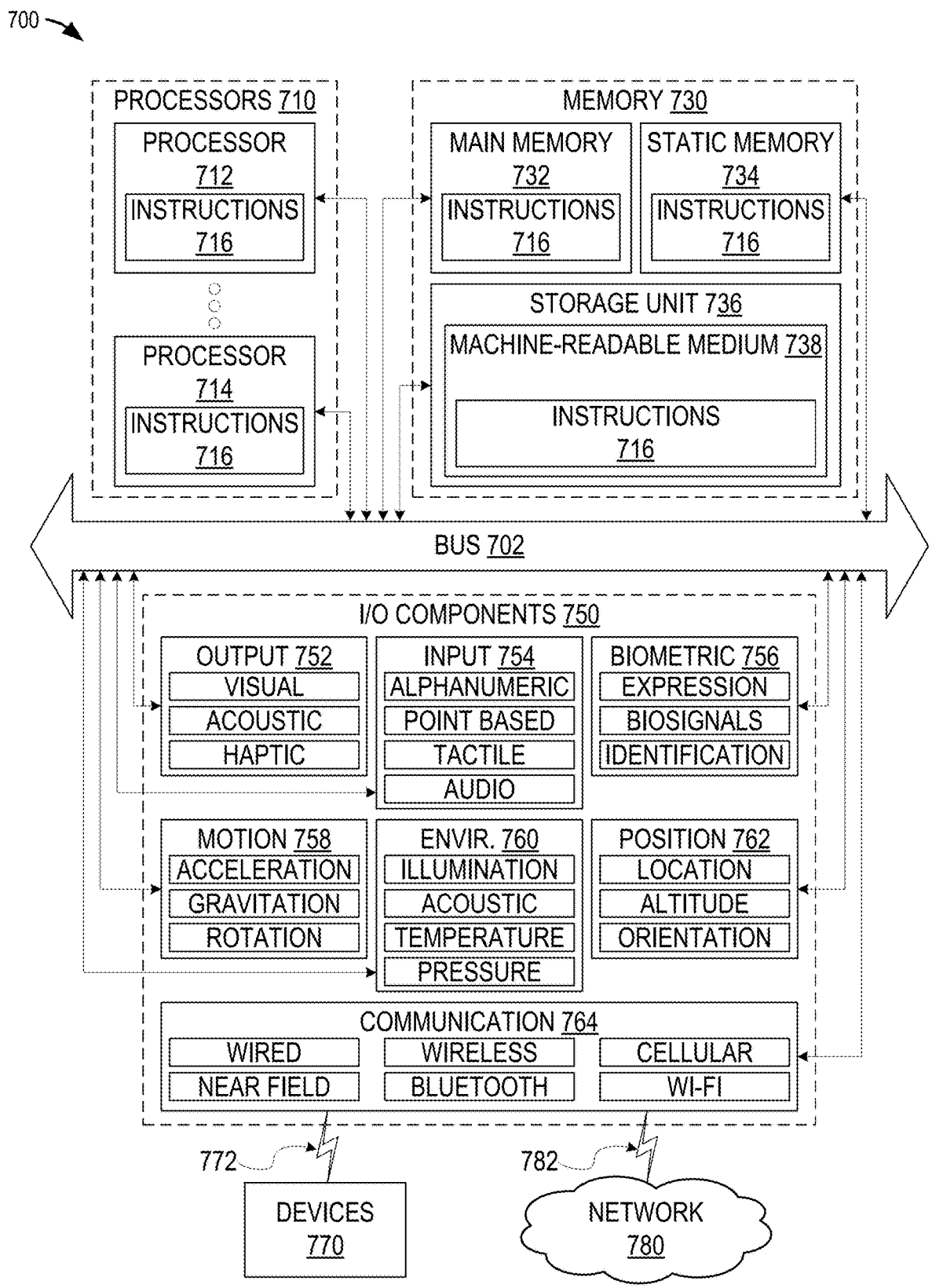
FIG. 7 illustrates a diagrammatic representation of a machine, in the form of a computer system, within which a set of instructions may be executed for causing the machine to perform any one or more of the methodologies discussed herein, according to an example embodiment.

FIG. 7 is a block diagram illustrating components of a machine 700, according to some embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 716 (e.g., software, a program, an application 610, an applet, an app, or other executable code) for causing the machine 700 to perform any one or more of the methodologies discussed herein can be executed. In alternative embodiments, the machine 700 operates as a standalone device or can be coupled (e.g., networked) to other machines. In a networked deployment, the machine 700 may operate in the capacity of a server machine or system 130, 102, 120, 122, 124, etc., or a client device 110 in a server-client network environment, or as a peer machine in a peer-to-peer (or distributed) network environment. The machine 700 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

In various embodiments, the machine 700 comprises processors 710, memory 730, and I/O components 750, which can be configured to communicate with each other via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 712 and a processor 714 that may execute the instructions 716. The term "processor" is intended to include multi-core processors 710 that may comprise two or more independent processors 712, 714 (also referred to as "cores") that can execute instructions 716 contemporaneously. Although FIG. 7 shows multiple processors 710, the machine 700 may include a single processor 710 with a single core, a single processor 710 with multiple cores (e.g., a multi-core processor 710), multiple processors 712, 714 with a single core, multiple processors 712, 714 with multiples cores, or any combination thereof.

The memory 730 comprises a main memory 732, a static memory 734, and a storage unit 736 accessible to the processors 710 via the bus 702, according to some embodiments. The storage unit 736 can include a machine-readable medium 738 on which are stored the instructions 716 embodying any one or more of the methodologies or functions described herein. The instructions 716 can also reside, completely or at least partially, within the main memory 732, within the static memory 734, within at least one of the processors 710 (e.g., within the processor's cache memory), or any suitable combination thereof, during execution thereof by the machine 700. Accordingly, in various embodiments, the main memory 732, the static memory 734, and the processors 710 are considered machine-readable media 738.

As used herein, the term "memory" refers to a machine-readable medium 738 able to store data temporarily or permanently and may be taken to include, but not be limited to, random-access memory (RAM), read-only memory (ROM), buffer memory, flash memory, and cache memory. While the machine-readable medium 738 is shown, in an example embodiment, to be a single medium, the term "machine-readable medium" should be taken to include a single medium or multiple media (e.g., a centralized or distributed database, or associated caches and servers) able to store the instructions 716. The term "machine-readable medium" shall also be taken to include any medium, or combination of multiple media, that is capable of storing instructions (e.g., instructions 716) for execution by a machine (e.g., machine 700), such that the instructions 716, when executed by one or more processors of the machine 700 (e.g., processors 710), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 750 include a wide variety of components to receive input, provide output, produce output, transmit information, exchange information, capture measurements, and so on. In general, it will be appreciated that the I/O components 750 can include many other components that are not shown in FIG. 7. The I/O components 750 are grouped according to functionality merely for simplifying the following discussion, and the grouping is in no way limiting. In various example embodiments, the I/O components 750 include output components 752 and input components 754. The output components 752 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 754 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 750 include biometric components 756, motion components 758, environmental components 760, or position components 762, among a wide array of other components. For example, the biometric components 756 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 758 include acceleration sensor components (e.g., accelerometer), gravitation sensor components, rotation sensor components (e.g., gyroscope), and so forth. The environmental components 760 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 762 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 750 may include communication components 764 operable to couple the machine 700 to a network 780 or devices 770 via a coupling 782 and a coupling 772, respectively. For example, the communication components 764 include a network interface component or another suitable device to interface with the network 780. In further examples, communication components 764 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 770 may be another machine 700 or any of a wide variety of peripheral devices (e.g., a peripheral device coupled via a Universal Serial Bus (USB)).

Moreover, in some embodiments, the communication components 764 detect identifiers or include components operable to detect identifiers. For example, the communication components 764 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 764, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 780 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WIFI® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 716 are transmitted or received over the network 780 using a transmission medium via a network interface device (e.g., a network interface component included in the communication components 764) and utilizing any one of a number of well-known transfer protocols (e.g., Hypertext Transfer Protocol (HTTP)). Similarly, in other example embodiments, the instructions 716 are transmitted or received using a transmission medium via the coupling 772 (e.g., a peer-to-peer coupling) to the devices 770. The term "transmission medium" shall be taken to include any intangible medium that is capable of storing, encoding, or carrying the instructions 716 for execution by the machine 700, and includes digital or analog communications signals or other intangible media to facilitate communication of such software.

Furthermore, the machine-readable medium 738 is non-transitory (in other words, not having any transitory signals) in that it does not embody a propagating signal. However, labeling the machine-readable medium 738 "non-transitory" should not be construed to mean that the medium is incapable of movement; the medium 738 should be considered as being transportable from one physical location to another. Additionally, since the machine-readable medium 738 is tangible, the medium 738 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
accessing, by a server system, image data comprising a plurality of images, text extracted from each of the plurality of images, and a geographic location where each of the plurality of images was captured;
accessing, by the server system, place data comprising a geographic location of each place and a place name associated with each place;
generating, by the server system, sets of candidates, each set comprising images and places that are located within a threshold geographic proximity based on the geographic location where each of the plurality of images was captured and the geographic location of each place;
for each set of candidates, performing operations comprising:
matching a place name with text extracted from an image to generate a place name similarity score;
generating a distance similarity score based on the distance between a location of the geographic location of the place and the geographic location of where the image was captured; and
generating a similarity score based on the place name similarity score and the distance similarity score;
selecting, for each place, an image with the highest similarity score as a potential match for each place;
storing the respective selected image as place data associated with each place, based on determining that the place name similarity score for the extracted text associated with the respective selected image is higher than a second predetermined threshold;
receiving, by the server system, a request for navigation instructions from a computing device;
determining, from the stored selected images, that there is an image of a destination location for the request for navigation instructions; and
providing the image to the computing device to display the image to a driver of a vehicle for navigation.

2. The method of claim 1, wherein the geographic location where each of the plurality of images was captured includes latitude and longitude information associated with a location of each of the plurality of images.

3. The method of claim 1, wherein the threshold geographic proximity comprises an S2 cell and neighboring S2 cells.

4. The method of claim 1, further comprising:
accessing the image data comprising the plurality of images and the geographic location where each of the plurality of images was captured;
analyzing the image data for each of the plurality of images, using a trained machine learning model configured to determine how likely an image comprises a logo associated with a place, to generate a logo detection score;
determining whether the logo detection score for each of the plurality of images is greater than a predetermined threshold; and
storing an image as place data associated with a place, based on determining that the name similarity score for the extracted text associated with the image is higher than a second predetermined threshold.

5. The method of claim 1, wherein generating the distance similarity score based on the distance between the location of the geographic location of the place and the geographic location of where the image was captured comprises:
using a geocoordinate of the location of the geographic location of the place and a geocoordinate of the geographic location of where the image was captured;
calculating geographic proximity of both geocoordinates; and
generating the distance similarity score based on the calculated geographic proximity.

6. The method of claim 1, wherein matching the place name with text extracted from each image to generate a name similarity score comprises:
accessing a previously generated substitution dictionary comprising common misclassifications occurring in text extracted from images;
aligning and scoring text extracted for an image using the substitution dictionary to modulate character-wise substitution penalties against the place name; and
generating the name similarity score based on the aligning and scoring.

7. The method of claim 1, wherein generating the similarity score based on the place name similarity score and the distance similarity score comprises combining the place name similarity score and the distance similarity score using a pair of coefficients learned through a machine learning model.

8. The method of claim 1, wherein generating the name similarity score based on matching the extracted text of the image to the place name comprises:
   for each place with an associated image as the potential match, aligning the extracted text with the place name and aggregating the aligned extracted text into a single sequence a same length as the place name; and
   generating the name similarity score based on matching the single sequence to the place name.

9. The method of claim 8, further comprising:
   eliminating a place and the image that is a potential match with the place from consideration for generating a name similarity score based on determining that the single sequence comprises more than a predetermined threshold percent of incorrect characters in the single sequence.

10. A server computer comprising:
    a memory that stores instructions; and
    one or more processors configured to:
    access image data comprising a plurality of images, text extracted from each of the plurality of images, and a geographic location where each of the plurality of images was captured;
    access place data comprising a geographic location of each place and a place name associated with each place;
    generate sets of candidates, each set comprising images and places that are located within a threshold geographic proximity based on the geographic location where each of the plurality of images was captured and the geographic location of each place;
    for each set of candidates, performing operations comprising:
    match a place name with text extracted from an image to generate a place name similarity score;
    generate a distance similarity score based on the distance between a location of the geographic location of the place and the geographic location of where the image was captured; and
    generate a similarity score based on the place name similarity score and the distance similarity score;
    select, for each place, an image with the highest similarity score as a potential match for each place;
    store the respective selected image as place data associated with each place, based on determining that the place name similarity score for the extracted text associated with the respective selected image is higher than a second predetermined threshold;
    receive a request for navigation instructions from a computing device;
    determine, from the stored selected images, that there is an image of a destination location for the request for navigation instructions; and
    provide the image to the computing device to display the image to a driver of a vehicle for navigation.

11. The server computer of claim 10, wherein the geographic location where each of the plurality of images was captured includes latitude and longitude information associated with a location of each of the plurality of images.

12. The server computer of claim 10, wherein the threshold geographic proximity comprises an S2 cell and neighboring S2 cells.

13. The server computer of claim 10, the one or more processors further configured to:
    access the image data comprising the plurality of images and the geographic location where each of the plurality of images was captured;
    analyze the image data for each of the plurality of images, using a trained machine learning model configured to determine how likely an image comprises a logo associated with a place, to generate a logo detection score;
    determine whether the logo detection score for each of the plurality of images is greater than a predetermined threshold; and
    store an image as place data associated with a place, based on determining that the name similarity score for the extracted text associated with the image is higher than a second predetermined threshold.

14. The server computer of claim 10, the one or more processors further configured to:
    use a geocoordinate of the location of the geographic location of the place and a geocoordinate of the geographic location of where the image was captured;
    calculate geographic proximity of both geocoordinates; and
    generating the distance similarity score based on the calculated geographic proximity.

15. The server computer of claim 10, the one or more processors further configured to:
    access a previously generated substitution dictionary comprising common misclassifications occurring in text extracted from images;
    align and scoring text extracted for an image using the substitution dictionary to modulate character-wise substitution penalties against the place name; and
    generate the name similarity score based on the aligning and scoring.

16. The server computer of claim 10, the one or more processors further configured to combine the place name similarity score and the distance similarity score using a pair of coefficients learned through a machine learning model.

17. The server computer of claim 10, the one or more processors further configured to:
    for each place with an associated image as a potential match, align the extracted text with the place name and aggregate the aligned extracted text into a single sequence a same length as the place name; and
    generate the name similarity score based on matching the single sequence to the place name.

18. The server computer of claim 17, the one or more processors further configured to:
    eliminate a place and the image that is a potential match with the place from consideration for generating a name similarity score based on determining that the single sequence comprises more than a predetermined threshold percent of incorrect characters in the single sequence.

19. A non-transitory computer-readable medium comprising instructions stored thereon that are executable by at least one processor to cause a computing device to:
    access image data comprising a plurality of images, text extracted from each of the plurality of images, and a geographic location where each of the plurality of images was captured;

access place data comprising a geographic location of each place and a place name associated with each place;
generate sets of candidates, each set comprising images and places that are located within a threshold geographic proximity based on the geographic location where each of the plurality of images was captured and the geographic location of each place;
for each set of candidates, performing operations comprising:
match a place name with text extracted from an image to generate a place name similarity score;
generate a distance similarity score based on the distance between a location of the geographic location of the place and the geographic location of where the image was captured; and
generate a similarity score based on the place name similarity score and the distance similarity score;
select, for each place, an image with the highest similarity score as a potential match for each place;
store the respective selected image as place data associated with each place, based on determining that the place name similarity score for the extracted text associated with the respective selected image is higher than a second predetermined threshold;
receive a request for navigation instructions from a computing device;
determine, from the stored selected images, that there is an image of a destination location for the request for navigation instructions; and
provide the image to the computing device to display the image to a driver of a vehicle for navigation.

20. The method of claim 1, wherein generating a similarity score for each image and place in the set of candidates based on a distance between the geographic location where each image was captured and the geographic location of each place is further based on a max radius comprising a value for a largest possible radius for each place.

* * * * *